United States Patent [19]

Ishihara et al.

[11] 4,021,712

[45] May 3, 1977

[54] CONTROL SYSTEM FOR AUTOMATIC TRANSMISSION FOR ELECTRIC AUTOMOBILES

[75] Inventors: Tomoo Ishihara, Tokyo; Toshimitsu Sakai, Toyota; Yasufumi Yamada, Kariya, all of Japan

[73] Assignee: Toyota Jidosha Kogyo Kabushiki Kaisha, Toyota, Japan

[22] Filed: May 7, 1975

[21] Appl. No.: 575,208

[30] Foreign Application Priority Data

May 10, 1974 Japan .............................. 49-51314

[52] U.S. Cl. ............................. 318/432; 318/139; 180/65 R; 192/.02 R; 74/859; 74/866
[51] Int. Cl.² ........................................ H02P 5/06
[58] Field of Search ............................ 318/9–15, 318/139, 432; 180/65 R; 192/.02, .032, .033, .084, .098, 2; 310/83; 74/687, 688, 857–860, 866

[56] References Cited

UNITED STATES PATENTS

| | | | |
|---|---|---|---|
| 3,794,133 | 2/1974 | Sugiura et al. | 180/65 |
| 3,834,499 | 9/1974 | Candellero et al. | 192/.033 X |
| 3,861,485 | 1/1975 | Busch | 318/11 X |
| 3,896,914 | 7/1975 | Konsbruck et al. | 318/10 X |
| 3,898,893 | 8/1975 | Hashimoto et al. | 74/866 X |
| 3,984,742 | 10/1976 | Bader | 74/866 X |

*Primary Examiner*—Robert J. Hickey
*Attorney, Agent, or Firm*—Finnegan, Henderson, Farabow & Garrett

[57] ABSTRACT

The embodiments of the control system for automatic transmissions for electric automobiles disclosed includes an electric motor drive control, a changeover device, a speed change control, a torque setting device, a transmitting force detector, and a motor output torque detector. The present control system enables the fluctuation of the transmission output shaft torque to be counteracted by the DC electric motor output torque for realizing extremely smooth transmission of motive power.

6 Claims, 10 Drawing Figures

CONTROL SYSTEM FOR AUTOMATIC TRANSMISSION FOR ELECTRIC AUTOMOBILES

BACKGROUND OF THE INVENTION

This invention relates to a speed change control system for automatic transmissions used in combination with a DC electric motor in electric automobiles. More particularly it relates to an automatic transmission control system of the type recited specifically designed for minimizing the shock or impact caused by the reaction to the locking of elements of the change gear unit during the operation of the frictional coupling means to effect speed change or when transmitting motive power to the rotational elements.

In automatic transmissions of electric automobiles there is a difficult problem that excess shock is produced by the action of the frictional coupling means during speed change. Several methods have been proposed to alleviate such shock of transmission, such as for example by controlling hydraulic pressure supplied to the servo mechanism of the frictional coupling device to smooth its operation. Such means, however, gave rise to a new problem of deterioration by wear of the frictional coupling device as it slides. Thus, none of the heretofore proposed methods has proved to be a perfect solution to the problem.

In view of the above, the present invention has the object of effectively lessening the transmission shock. The present invention takes into account the fact that the transmission output shaft torque fluctuates widely at the time of speed change thereby causing shock of transmission. Consequently the control system of the present invention prevents such fluctuation of the transmission output shaft torque by using the output torque of a DC electric motor to counteract the fluctuations thereby allowing extremely smooth transmission of power.

SUMMARY OF THE INVENTION

The present invention overcomes the problems of the prior art by providing a control system for automatic transmissions of electric automobiles which have a plurality of speed change gears and frictional coupling means for operating the speed change gears. Considered in its broad aspect the control comprises a vehicle running control to which the DC electric motor is responsive, a changeover mechanism which when actuated interrupts the control function of the vehicle running control, and a speed change control which operates the frictional coupling means during a speed change simultaneously with the actuation of the changeover mechanism. Both the changeover mechanism and the speed change control are responsive to a vehicle speed change signal. Further, a torque setting unit is provided for controlling the motor output torque during the changeover period when the transmission output shaft torque is varying until the vehicle speed and motor speed are synchronized, the torque setting unit controlling the motor output torque thereby eliminating fluctuation of the transmission output shaft torque. Finally, means are included for detecting the transmitting force of the frictional coupling means and the motor output torque to effectuate the proper operation of the torque setting unit.

BRIEF DESCRIPTION OF THE DRAWINGS

The present invention is described in detail by way of the preferred embodiments as illustrated in the accompanying drawings in which.

DESCRIPTION OF THE PREFERRED EMBODIMENTS

Figure 1:
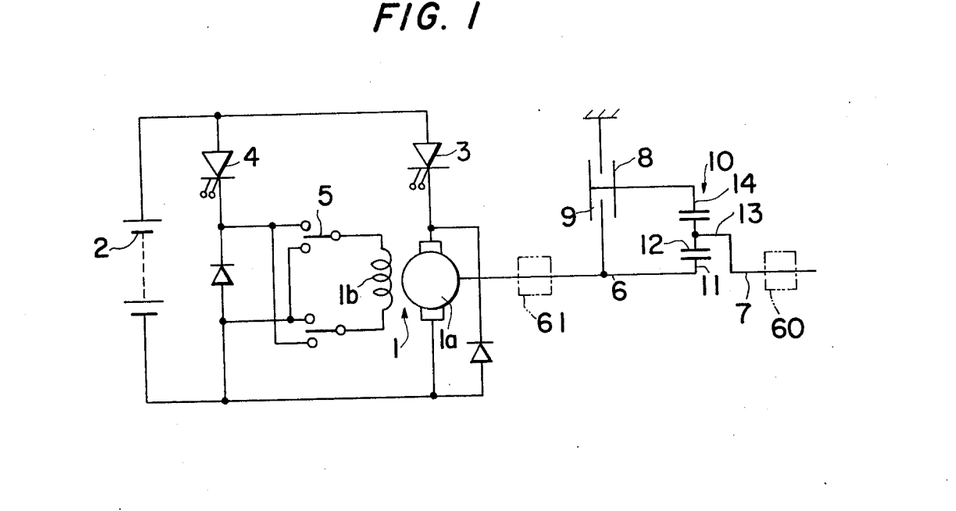
FIG. 1 is a schematic block diagram of an automatic transmission incorporating the present invention and shown with a motor driving circuit.

Referring first to FIG. 1, it will be seen that the armature 1a of a DC electric motor 1 is connected to a battery 2 through an armature current controlling DC chopper 3 made up of a thyristor and other elements. The field coil 1b of said motor 1 is also connected to the battery 2 through a field current controlling DC chopper 4 and a motor reversing switch 5. These DC choppers 3 and 4 function to change the armature current and the field current, respectively, to control speed of the motor 1.

Connected in combination with the motor 1 is a two-speed automatic transmission. This automatic transmission comprises a planetary gear unit 10 of which the sun gear 11 is connected to the input shaft 6 extending from the armature 1a, and a carrier 13 pivotally supporting a pinion 12 meshed with the sun gear 11 and connected to the output shaft 7. Also, a multiple disc brake 8 is coupled to a ring gear 14 meshed with the pinion 12. A similar multiple-disc clutch 9 is provided between the brake and the input shaft 6. When the brake 8 is applied to lock the ring gear 14, speed is reduced proportionate to the gear ratio between the sun gear 11 and ring gear 14 to provide a low speed range. When the clutch 9 is applied to convey motor power to the ring gear 14, too, the gears of the planetary gear unit 10 are engaged and directly connected to the motor 1 to establish a high speed range.

There is incorporated in the present invention a hydraulic circuit for operating said brake 8 and clutch 9 at each speed range, and such hydraulic circuit is now described with reference to FIG. 2.

Figure 2:
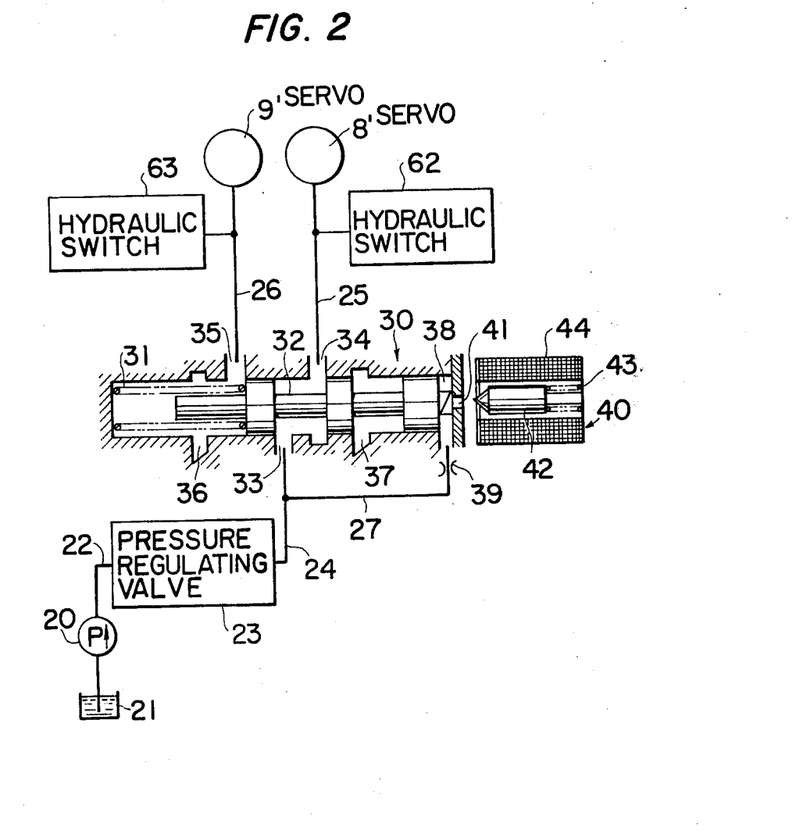
FIG. 2 is a speed change controlling hydraulic circuit diagram.

As seen in FIG. 2, oil in an oil reservior 21 is pumped up by an oil pump 20 and guided into a pressure regulating valve 23 by way of line 22. After adjustment to a predetermined pressure by the pressure regulating valve 23, the oil under pressure is then guided through a line 24 to a shift valve assembly 30 equipped with a solenoid valve 40. Then the oil pressure is further transmitted through a line 25 into a servo mechanism 8' adapted for operating the brake 8 or through a line 26 into a servo mechanism 9' adapted for operating the clutch 9. The shift valve assembly 30 consists of a spool 32 arranged to be movable with a return spring 31 being loaded on one side thereof, ports 33 and 35 connected to the lines 24 and 26, respectively, drain ports 36 and 37, an oil chamber 38 connected to a line 27 and an orifice 39 provided in the line 27 for preventing drop of oil pressure. The line 27 branches off from the line 24 and is arranged to communicate oil pressure to that side of the spool 32 which is opposite from the spring-loaded side thereof.

The solenoid valve 40 comprises a plunger 42 adapted to open or close an orifice 41 for drainage of the oil chamber 38, a return spring 43 loaded on one side of the plunger 42, and a coil 44 adapted to be connected to a power source. When the coil 44 of the solenoid valve 40 is energized, the plunger 42 is retracted by the electromagnetic force produced to open the orifice 41, as shown in the drawing, thereby reducing oil pressure in the oil chamber 38. The spool 32 of the shift valve assembly 30 is thereby moved to the right by the spring 31 so that oil pressure is transmitted to the servo mechanism 8' through ports 33 and 34 and line 25, while discharging oil and reducing pressure in the servo mechanism 9' through ports 35 and 36. A low speed condition is thereby established.

On the other hand, if the coil 44 is de-energized, the plunger 42 is advanced by the spring 43 to close the orifice 41 to maintain oil pressure in the oil chamber 38, so that the spool 32 is now moved to the left. The oil pressure is transmitted to the servo mechanism 9' through ports 33 and 35 while discharging pressure in the servo mechanism 8' through ports 34 and 37, thereby providing a high speed drive.

Another feature of the present invention is an electric circuit incorporated in the system for operating the above-mentioned DC choppers 3, 4 and solenoid valve 40. This electric circuit is now described with reference to FIG. 3

Figure 3:
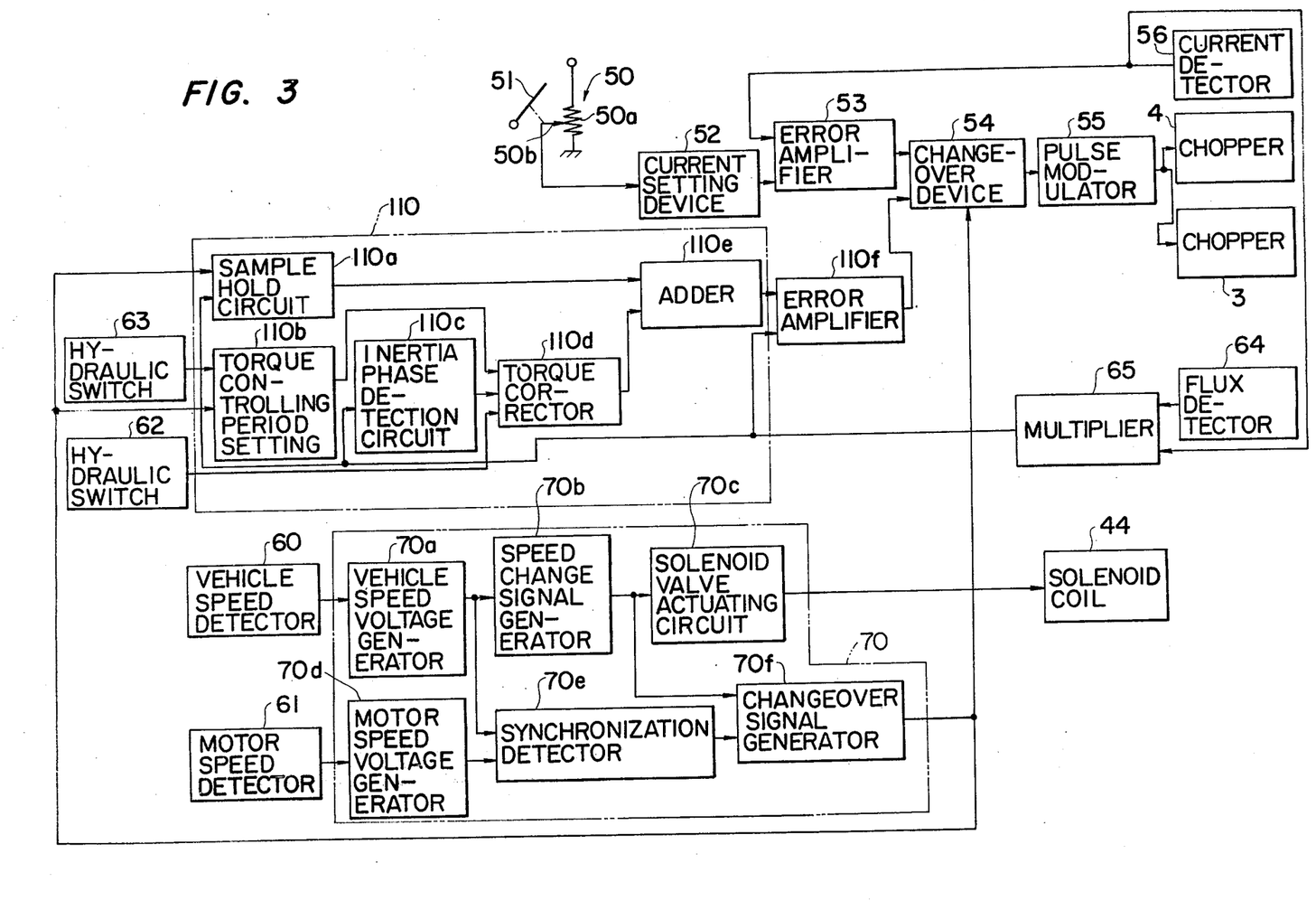
FIG. 3 is a block diagram of the speed change and motor drive controlling mechanism.

There is provided an acceleration sensor 50 which comprises a resistance 50a and a contactor 50b operable in response to movement of an acceleration pedal 51 to change the value of the resistance 50a, and provided a voltage proportional to the depression of the acceleration pedal 51. The contactor 50b side of the acceleration sensor 50 is connected to the DC choppers 3 and 4 through a current setting device 52 for setting a current corresponding to the depression of the acceleration pedal, an error amplifier 53, a changeover device 54 and a pulse modulator 55. A current detector 56 for detecting the armature current in the motor 1 is connected to the negative input side of the error amplifier 53. Under a normal condition, the changeover device 54 is in a conductive state to generate a speed control signal depending on the difference between the current corresponding to the depression of the acceleration pedal and the current flowing in the armature 1a. The conductivity of the choppers 3 and 4 and the consequent average applied to the armature 1a and field coil 1b are changed according to the speed control signal to provide an armature current corresponding to the depression of the acceleration pedal 51. But when a gear change is effected, the changeover device 54 interrupts the output signal from the error amplifier 53 and hence no motor speed control is effected any longer for depression of the acceleration pedal.

Connected to the changeover controlling side of the changeover device 54 is a speed change controller 70 which comprises a vehicle speed voltage generator 70a, a speed change signal generator 70b, a solenoid valve actuating circuit 70c, a motor speed voltage generator 70d, a synchronization detector 70e and a changeover signal generator 70f. Inputs to the speed change controller 70 are connected to a vehicle speed detector 60 and a motor speed detector 61. The coil 44 of the solenoid valve 40 (FIG. 2) is connected to the solenoid valve actuating circuit 70c so that the coil 44 is energized or de-energized according to the vehicle speed to effect speed change while the changeover signal generator 70f provides a changeover signal to the changeover device 54. The changeover signal is effective during the period from start of speed change till the time when the motor speed is synchronized with the vehicle speed.

Connected to another input side of the changeover device 54 through the motor output torque setting unit 110 are hydraulic switches 62 and 63 which become active at the time of speed change. The switches 62 and 63, as shown in FIG. 2, are provided in the oil lines 25 and 26 leading to the servo mechanisms 8' and 9', respectively. These are respectively closed upon build-up of oil pressure within each line.

Motor output torque setting unit 110 is connected to a multiplier 65 which provides a voltage proportional to the motor output torque in response to the signals from the current detector 56 and a flux detector 64 adapted to detect the magnetic flux from the field coil 1b by utilizing for example a Hall element. The motor output torque setting unit 110 comprises a sample and hold circuit 110a, a torque controlling period setting means 110b, an inertia phase detection circuit 110c, a torque corrector 110d, an adder 110e and an error amplifier 110f. It is arranged such that the motor output torque developed by the DC choppers 3 and 4 is changed in a manner contrary to fluctuations of the transmission output shaft torque.

In connection with the above electric circuit of FIG. 3, no further description is here given to the current setting device 52, error amplifier 53, changeover device 54 and pulse modulator 55 which are already known in the art. However, the speed change controller 70 and the motor output torque setting unit 110, which constitute important elements of the present invention, are described below in further detail.

Figure 4:
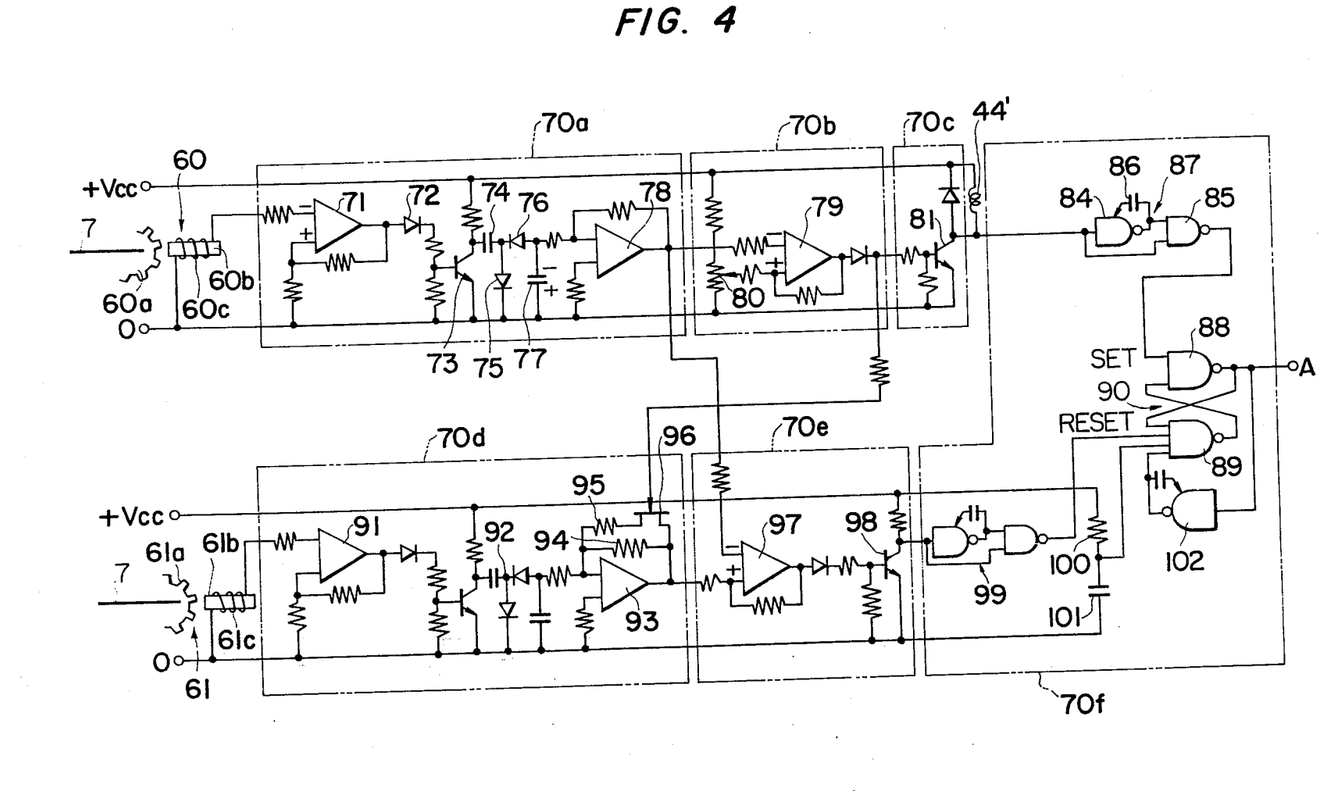
FIG. 4 is an electric circuit diagram showing in detail the speed change controller of FIG. 3.

Referring to FIG. 4, the vehicle speed detector 60 is made up of a rotor 60a mounted on the transmission output shaft 7, a permanent magnet 60b disposed in opposition to the rotor, and a coil 60c wound around said magnet. The vehicle speed detector 60 is adapted to function to produce an alternating voltage of a frequency proportional to the vehicle speed. The coil 60c of this vehicle speed detector 60 is connected to an operational amplifier 71 connected as a comparator for converting the alternating voltage wave into a square wave. The square wave is passed through diode 72 to transistor 73 and capacitor 74 adapted to differentiate the square wave to produce a number of pulses proportional to the vehicle speed. A diode 75 connected to ground is arranged to pass only pulses of negative polarity, and diode 76 inhibits electric discharge of capacitor 74. A capacitor 77 charged to the polarity shown develops an analogue voltage proportionate to the vehicle speed and an operational amplifier 78 inverts and amplifies the voltage. The vehicle speed voltage generator 70a thereby generates a DC voltage proportional to the vehicle speed.

The operational amplifier 78 is connected to one input side of the operational amplifier 79 in the speed change signal generator 70b. A variable resistance 80, adapted to provide a reference voltage corresponding to the vehicle speed at the shifting point from a low speed to a high speed range, is connected to the other input side of the amplifier 79. The output signal of amplifier 79 is therefore a speed change signal according to the comparison between the inputs. The operational amplifier 79 is further connected to the coil 44 of the solenoid valve 40 through transistor 81 in the solenoid valve actuating circuit 70c.

Thus, if the output voltage from the operational amplifier 78 is lower than the reference voltage of the variable resistance 80 during the low speed drive, the output of the operational amplifier 79 will be a high potential making the transistor 81 conductive to energize the coil 44 and thereby establish a low speed range as aforesaid. When the vehicle speed is increased and the output voltage exceeds the reference voltage, the output of the operational amplifier 79 is now reduced to a low potential to make the transistor 81 non-conductive, whereby the coil 4 is de-energized to automatically effect a shift to a higher speed range.

Also, the collector of the transistor 81 in the speed change control system is connected to the signal generator 70f and specifically to the set input side of a flip-flop circuit 90 consisting of two NAND gates 88 and 89 through a pulse generating circuit 87. The circuit 87 consists of two NAND gates 84 and 85 and a capacitor 86, which functions to generate a changeover signal when speed change is effected.

The motor speed detector 61, like the above described vehicle speed detector 60, is made up of a rotor 61a mounted on the transmission input shaft 6, a permanent magnet 61b disposed in opposition thereto, and a coil 61c wound around said magnet 61b. It functions to produce an alternating voltage of a frequency proportionate to the motor speed. The coil 61c of the motor speed detector 61 is connected to the motor speed voltage generator 70d, which comprises an operational amplifier 91 adapted to function as a comparator, a pumping circuit 92 for rectifying the wave form and an operational amplifier 93 for inverted amplification, so as to as to produce a DC voltage proportionate to the motor speed.

Across the input and output sides of the operational amplifier 93 are provided the parallel-connected resistances 94 and 95 and a field-effect transistor 96 having its gate side connected to the output side of the operational amplifier 79. These elements are arranged such that when the transistor 96 is in a conductive state, the gain of the operational amplifier 93 is changed to reduce the rate of variation of the output voltage thereof. The operational amplifier 93 is connected to the transistor 98 of the synchronization detector 70e through the operational amplifier 97 which functions as a comparator. Operational amplifier 97 is connected at its one input side to the output side of the operational amplifier 78, and consequently outputs a synchronizing signal when the motor speed is synchronized with the vehicle speed.

Also, the transistor 94 is further connected to the reset input side of the flip-flop circuit 90 through another pulse generating circuit 99 in the changeover signal generator 70f. The changeover signal is thereby interrupted when synchronization has been achieved. Connected to the reset input side of the flip-flop circuit 90 are a resistance 100 and a capacitor 101 for reducing the output to a low potential when power has been connected. Also connected to the reset input side is a delay circuit 102 for preventing the output of the circuit 90 from staying at a high potential longer than a certain fixed time. The set output side A is connected to the changeover device 54.

Thus, in the low speed range, the transistor 81 remains conductive with a high potential applied to it from the operational amplifier 79, so that the input of the NAND gate 84 is reduced to a low potential while the output of the pulse generating circuit 87 is at a high potential. The transistor 96 is also rendered conductive to lower the total resistivity of the resistances 94 and 95, so that the gain of the voltage output from the operational amplifier 93 proportional to the motor speed is set low.

However, since the motor speed is always higher than the vehicle speed and the output of the operational amplifier 97 is maintained at a high potential, the transistor 98 is conductive allowing the output of the pulse generating circuit 99 to have a high potential, so that the output A of the flip-flop circuit 90 is rendered to a low potential to make the changeover device 54 inactive. Then, when a gearshift is effected to a higher speed and the output of the operational amplifier 79 is changed to a low potential to render the transistor 81 non-conductive, the input of the NAND gate 84 is converted to a high potential to produce a pulse of negative polarity from the pulse generating circuit 87, applied to the set input of flip-flop circuit 90, thereby inducing a higher potential at the output of the flip-flop circuit 90.

During such gear change, if the transistor 96 is turned into a non-conductive state so that the gain of the output voltage of the operational amplifier 93 is increased only by the resistance 94, and also if the motor speed is still higher than the vehicle speed after gear change has been achieved, the output of the pulse generating circuit 99 will remain at a high potential as said above. Hence the flip-flop circuit 90 is not reset. But when the motor speed drops to become lower than the vehicle speed, the output of the operational amplifier 97 is reduced to a low potential at the time of synchronization to shut off the transistor 98. A pulse of negative polarity is generated from the pulse generating circuit 99, too, to reset the flip-flop circuit 90 and hence its output A is again reduced to a low potential. Thus, the changeover device 54 is operated to effect changeover to make the system unable to perform motor control corresponding to depression of the acceleration pedal during the time when the motor speed is being synchronized with the vehicle speed after a speed change.

Figure 5:
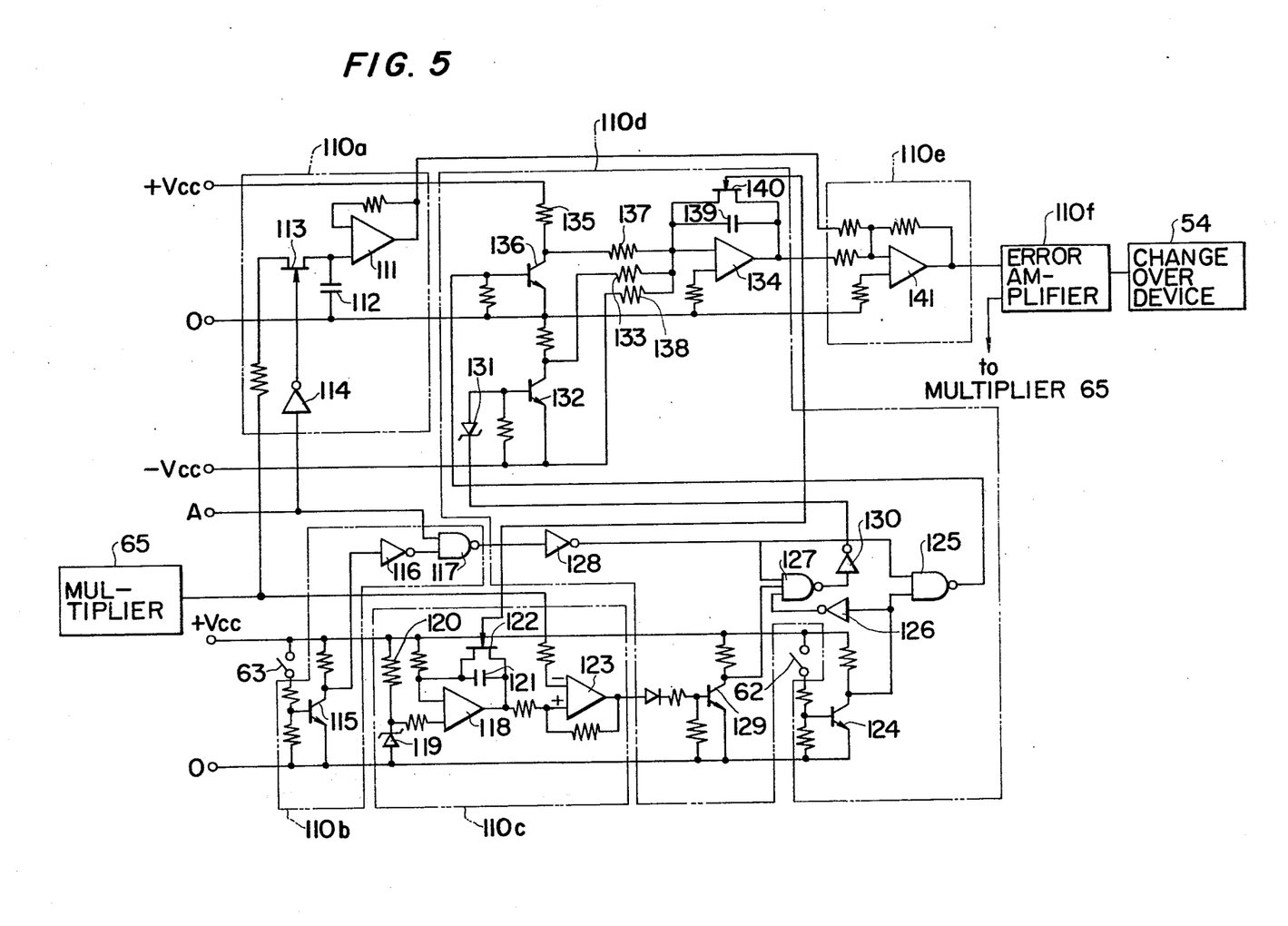
FIG. 5 is an electric circuit diagram showing in detail the motor output torque setting unit of FIG. 3.

Referring now to FIG. 5, there is shown the circuit diagram of the motor output torque setting unit 110. In the sample and hold circuit 110a, it will be seen that a capacitor 112 is connected to the input side of an operational amplifier 111. Multiplier 65 is also connected to the input side of the said amplifier 111 through a field-effect transistor 113. Connected to the gate side of the transistor 113, through an inverter 114, is the output side of the flip-flop circuit 90 (FIG. 4) of the aforesaid changeover signal generator 70f. When the transistor 113 is in the conductive state, there is produced from the operational amplifier 111 a voltage proportionate to the motor output torque of the multiplier 65. But when the transistor 113 becomes non-conductive, the output voltage of the operational amplifier 111 is maintained at the value which it had immediately before the change to non-conductive state by the capacitor 12.

The hydraulic switch 63 on the high speed side is connected to a transistor 115 of the torque controlling time setting unit 110b. The collector of transistor 115 is connected to an inverter 116 and then to a NAND gate 117 having its one input side connected to the output side of the flip-flop circuit 90 in FIG. 3. A torque controlling signal is generated synchronously with start of a change of the transmission output shaft torque after a speed change.

In the inertia phase detection circuit 110c, a Zener diode 119 is connected to one input side of the operational amplifier 118, at its cathode electrode, the other input side thereof is connected to a resistance 120. A parallel circuit of a capacitor 121 and a field-effect transistor 122, which has a gate side connected to the output side of the NAND gate 117 is connected between the other input and the output side of the amplifier 118. The output side of the operational amplifier 118 is connected to a comparing operational amplifier 123 while its other input side thereof being connected to the multiplier 65. These elements are arranged such as to determine the varying length of time of the transmission output shaft torque that would be produced due to imperfect release of the brake 8 and imperfect application of the clutch 9 after a speed change.

In the torque corrector circuit 110d, a transistor 124 connected to the hydraulic switch 62 on the low speed side is connected to a NAND gate 125 and also to another NAND gate 127 through an inverter 126. The NAND gate 117 is connected to the other input side of the NAND gates 125 and 127 through an inverter 128. Also connected to the input side of the NAND gate 127 is the aforementioned operational amplifier 123 through a transistor 129. The NAND gate 127 is connected to the input side of an operational amplifier 134 through an inverter 1330, a Zener diode 131, a transistor 132 arranged to have its emitter changed to a negative potential and its collector to zero potential, and a resistance 133. The NAND gate 125 is connected to the same input side of the operational amplifier 134 through a transistor 136 arranged to have its emitter at zero potential and also having its collector connected to the positive potential side by resitance 135 and to resistance 137.

Connected between one input side of the operational amplifier 134 and the negative potential Vcc is a resistance 138 having a greater resistivity that the series resistivity of the resistance 135 and 137. Connected between the same input side and the output side are a parallel circuit of a capacitor 139 and a field-effect transistor 140, which has a gate side connected to the output side of the NAND gate 117, so as to issue a torque correcting signal corresponding to variation of the transmission output shaft torque. Further, the operational amplifier 111 in the sample and hold circuit 110a and the operational amplifier 134 in the torque corrector 110d are connected to an operational amplifier 141 in the adder 110e. The amplifier 141 and the multiplier 65 are connected to the input side of the changeover device 54 through the error amplifier 110f.

The motor output torque controlling operation according to the above-described system is now described with reference to the graphic diagrams in FIGS. 6(a) through 6(d). In the low speed condition, the transistor 113 made is conductive by the inverter 114 since the output of the flip-flop circuit 90 is low in potential, so that voltage proportionate to the motor output torque from the multiplier 65 is applied unchanged to the operational amplifier 141. Thereupon, the ouput of the NAND gate 117 has a high potential to make the transistors 122 and 140 conductive, thereby to shut down the respective integrating operations performed by the respective amplifiers 118 and 134 and the respective capacitors 121 and 139. As the output of the operational amplifier 123 is also constantly maintained at a high potential to keep the transistor 129 conductive, the output of the NAND gate 127 comes to have a high potential and the transistor 132 is turned non-conductive by inversion of the invertor 130.

Figure 6A:
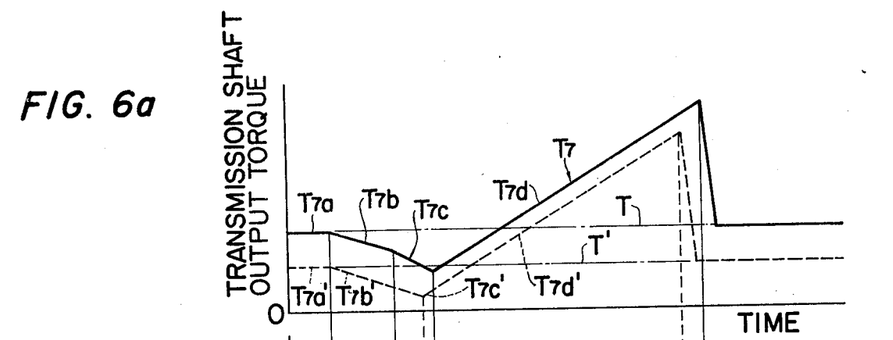
FIGS. 6(a) to (d) are the speed change characteristic charts as observed when effecting a speed change.
Figure 6B:
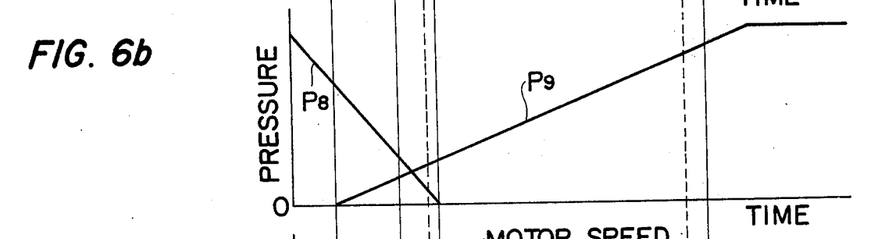

The servo mechanisms 8' on the low speed side maintains a predetermined level of oil pressure under constant oil feed as shown by solid line $P_8$ in FIG. 6(b). The hydraulic switch 62 is closed to render the transistor 124 conductive, so that the output of the NAND gate 125 has a high potential to make the transistor 136 conductive. The output voltage of the operational amplifier 134 is thereby lowered down to zero.

Then, when a shift is effected from such low speed to a higher speed range and the output of the flip-flop circuit 90 is switched to a high potential, the transistor 113 is rendered non-conductive by the signal from the flip-flop 90 through the inverter 114. The voltage proportional to the value of the motor output torque derived from the multiplier 65 at the time of such upshift is maintained by the capacitor 112 and applied to the operational amplifier 141. In the stage immediately after such upshift, the servo mechanism 9' on the high speed side is in a state where oil is being fed into the vacant piston chamber (in FIG. 2) as shown by solid line $P_9$ in FIG. 6(b), no oil pressure yet being produced. The hydraulic switch 63 stays open, so that the output of the NAND gate 117 is maintained at a high potential and the output voltage of the operational amplifier 134 remains at zero as described above. Thus, during this period, as the transmission output shaft torque does not fluctuate, shown by line segment $T_{7a}$ of solid line $T_7$ in FIG. 6(a), the motor output torque stays also constant as indicated by line segment $T_{6a}$ of solid line $T_6$ in FIG. 6(d).

When oil pressure builds up in the servo mechanism 9' on the high speed side starting at the time $t_1$ in FIG. 6 after gear change and as the clutch 9 begins, while sliding, to transmit power, the transmission output shaft torque decreases gradually as shown by line segment $T_{7b}$ in FIG. 6(a). The hydraulic switch 63 is then closed (as discussed above with reference to FIG. 2) to render the transistor 115 conductive, whereby the output of the NAND gate 117 is changed to a low potential and the transistors 122 and 140 become non-conductive. Consequently, the output voltage of the operational amplifier 118 is subjected to an integrating operation and is decreased lower than the voltage from the Zener diode 119 at a gradient corresponding to the time constant determined by the resistance 120 and capacitor 121. But as the output of the operational amplifier 123 is maintained at a high potential while the output voltage of the operational amplifier 118 remains higher than the voltage proportional to the motor output torque from the multiplier 65, one of the inputs of the NAND gate 127 is reduced down to a low potential to make the transistor 132 non-conductive.

At this stage, the servo mechanism 8' on the low speed side is in its pressure discharging stroke but oil pressure still exists therein to close the hydraulic switch 62 to make the transistor 124 conductive, so that the transistor 136 is made conductive by the NAND gate. The potential across resistances 133 and 137 on the input side of the operational amplifier 134 is lowered to zero potential. Consequently, the output voltage of the operational amplifier 134 is integrated by the resistance 138 of a negative potential and the capacitor 139 and rises at a gradient corresponding to the time constant thereof. The motor output torque is also raised up gently by the operation of the adder 110e and error amplifier 110f as shown by line segment $T_{6b}$ in FIG. 6(d).

Both brake 8 and clutch 9 act while sliding due to insufficient frictional torque transmitting force of the servo mechanisms 8' and 9' which are being pressure-discharged and oil-fed, respectively, in time $t_2$ in FIG. 6. But when the transmission output shaft torque begins to decrease at a gradient greater than $T_{7b}$ as shown by $T_{7c}$ in FIG. 6(a) with movement of the transmission to a situation close to neutral, the declining output voltage of the operational amplifier 118 becomes lower than the voltage proportional to the motor output torque from the multiplier 65. Therefore, the output voltage of the operational amplifier 123 is now reduced to a low potential to render the transistor 129 non-conductive, whereby the output voltage of the NAND gate 127 is reversed to a low potential and the transistor 132 is turned conductive by the inverter 130. Consequently, the resistance 133 is also connected in parallel to the resistance 138 and reduced to a negative potential, and hence the output voltage of the operational amplifier 134 is raised at a gradient corresponding to the time constant thereof. This gradient is greater than that in the aforesaid stage, thus causing the motor output torque to rise up in a manner shown by $T_{6c}$ in FIG. 6(d).

At time $t_3$ in FIG. 6, pressure in the servo mechanism 8' on the low speed side is substantially zero while oil pressure in the servo mechanism 9' on the high speed side has risen to allow the clutch 9 alone to operate. When the transmission output shaft torque is now raised up as shown by $T_{7d}$ in FIG. 6(a) with increase of the torque transmitting force of said clutch 9, the hydraulic switch 62 is opened to turn the transistor 124 non-conductive. Consequently, the output of the NAND gate 127 is again shifted to a high potential by the inverter 126 to change the transistor 132 to a non-conductive state. The output of the NAND gate 125 is the reversed to a low potential to make the transistor 136 non-conductive, with the result that the resistances 135 and 137 are series-connected to +Vcc to assume a positive potential.

Thus, the output voltage of the operational amplifier 134 is integrated by the capacitor 139, the resistance 138 (at a negative potential) and the resistances 135 and 137 (at a positive potential) and varies at a gradient corresponding to the time constant thereof. But since the total resistivity of the positive-potential resistances 135 and 137 is smaller than the resistivity of the resistance 138, the output voltage declines, causing the motor output torque to also fall as shown by $T_{6d}$ in FIG. 6(d).

Figure 6C:
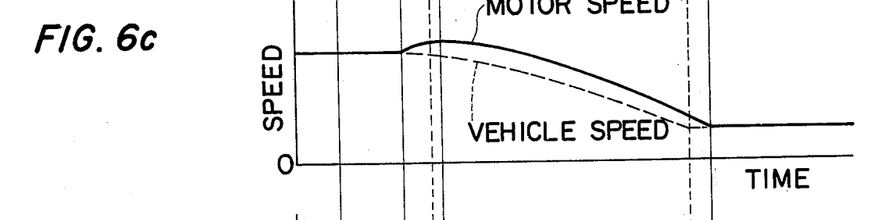
Figure 6D:
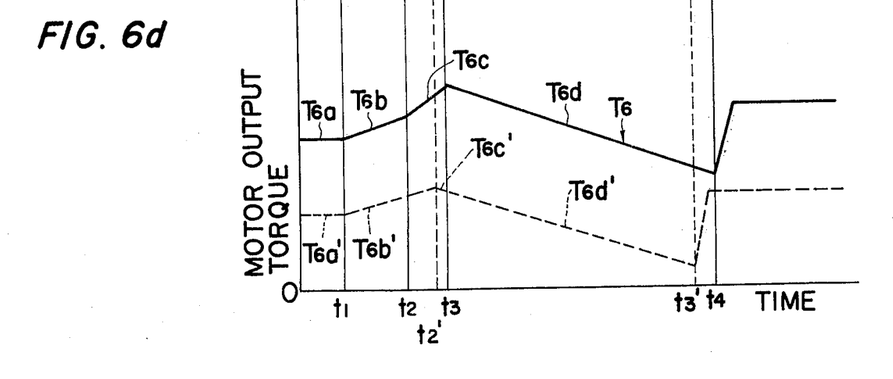

At time $t_4$ in FIG. 4 the vehicle speed and the motor speed are synchronized as shown in FIG. 6(c). The speed changing operation is completed and no fluctuation of the transmission output shaft torque takes place any longer. When the output voltage of the flip-flop circuit 90 is shifted to a low potential, the transistors 113, 122, and 140 are again brought into a conductive state and the NAND gate 125 is reversed to make the transistor 136 conductive thereby restoring the system to a normal running condition. The motor output torque controlling operation is completed. Thus, the actual transmission output shaft torque during the time of speed change is expressed by a substantially level line as shown by a line T in FIG. 6(a). It is controlled by the motor output torque which counteracts the fluctuation of the transmission output shaft torque.

Figure 7:
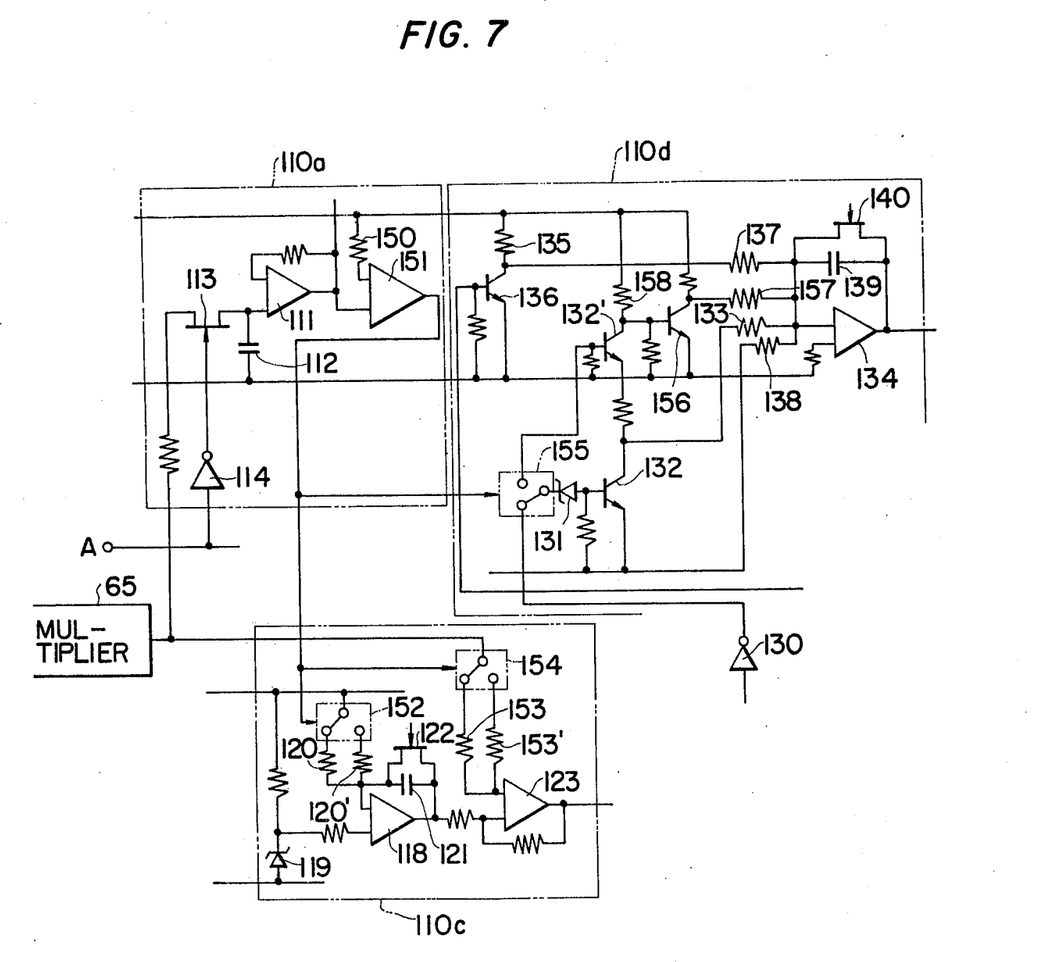
FIG. 7 is an electric circuit diagram of the essential parts of the motor output torque setting unit according to another embodiment of the present invention.

The foregoing embodiment of the invention is applied in the case when the motor output torque at the time of speed change is relatively large and the motor speed therefore increases during the period from time $t_2$ to time $t_3$ in FIG. 6 when both brake 8 and clutch 9 are sliding. In case the motor output torque at the time of speed change is smaller than the value determined by the transmitting torque of the clutch and other elements, the time at which both brake 8 and clutch 9 begin to slide is delayed. That is, the period of time $t_1$ to $t_2$ is lengthened to $t_1$ to $t_2'$ while the period of time $t_2$ to $t_3$ is shortened to to $t_2'$ to $t_3$ as shown by the broke lines in FIG. 6. In the period of time $t_2'$ to time $t_3'$ in FIG. 6 the motor speed is decreased to change the mode of fluctuation of the transmission output shaft torque, so that, in such a case, the torque setting unit 110 needs to switch the pattern of control according to the amount of the motor output torque at the time of speed change. A motor output torque setting unit 110 designed to meet such a requirement is shown in FIG. 7.

This unit is now described in detail while excluding description of the parts similarly to those in the unit shown in FIG. 5.

An operational amplifier 151 connected as a comparator with a resistance 150 which provides a reference voltage for judging the amount of motor output torque is connected to the output side of the operational amplifier 111 in the sample and hold circuit 110a. In the inertia phase detection circuit 110c, a switch means 152 for switching a resistance 120 and a resistance 120' having greater resistivity than said resistance 120 is provided on the input side of the operational amplifier 118. Between the operational amplifier 123 and amplifier 65 is provided a switch means 154 for switching a resistance 153 (same value means resistance as used in the unit of FIG. 5) and a resistance 153' having greater resistivity that the resistance 153. Connected to the input side of the operational amplifier 134 in the torque corrector 110d are the resistances 157 and 158 whose series resistivity is smaller than that of the resistance 138 and which are given a positive potential by the transistors 132' and 156. Also, a switch means 155 is provided between the output side of the Zener diode 131 and the base side of the transistors 132 and 132'.

If, at the time of speed change, the voltage proportional to the motor output torque retained by the capacitor 112 is higher than the reference voltage of the resistance 150 and the output of the operational amplifier 151 is thereby changed to a low potential, the switch means 152, 154 and 155 remain inactive to maintain the connections as shown in the drawing. Hence the unit operates the same way as that of FIG. 5. However, if the voltage proportional to the motor output torque becomes lower than the reference voltage and the output of the operational amplifier 151 is converted to a high potential, the resistance 120' on the input side of the operational amplifier 118 is switched to the resistance 120' by the switch neans 152, the resistance on the input side of the operational amplifier 123 is switched to 153' by the switch means 154, and the Zener diode 131 is connected to the transistor 132' by the switch means 155.

Thus, in proportion as the rate of the output voltage of the operational amplifier 118 in the inertia phase detection circuit 110c decreases, the level of the voltage proportional to the motor output torque from the multiplier 65 is also lowered. Time $t_2'$ in FIG. 6 at which the output of the operational amplifier 123 is converted to a low potential is consequently slightly later than the aforesaid time $t_2$ in FIG. 6. The motor output torque increases as shown by $T_{6d}'$ in broken line $T_6'$ in FIG. 6(d) in conformity to decline of the transmission output shaft torque shown by $T_{7b}'$ in broken line $T_7'$ in FIG. 6(a).

Then, when the output of the inverter 30 is turned to a high potential at time $t_2'$ in FIG. 6, the transistor 132' becomes conductive while the transistor 156 is non-conductive to induce a positive potential on the resistance 157 and 158. Because of the relation of resistivities of the resistances 138, 157 and 158, the output voltage of the operational amplifier 134 drops at a time constant determined by the resistances 138, 157 and 158 and capacitor 139, regardless of the presence of the resistance 138 at a negative potential. This causes the motor output torque to decrease as shown by $T_{6c}'$ in FIG. 6 (d) in accordance with increase of the transmission output shaft torque as shown by $T_{7c}'$ in FIG. 6(a).

From time $t_3$ in FIG. 6 forward, the motor output torque is controlled in completely the same way as in the case of FIG. 5. Hence, in this case, too, the transmission output shaft torque shift at the time of speed change is described by a substantially level line as shown by T' in FIG. 6(a).

As described above, according to the present invention, fluctuation of the transmission output shaft torque at the time of speed change is perfectly counteracted by the motor output torque, so that the shock of reaction caused by release of the brake 8 and application of the clutch 9 when directly connecting the motor and the automatic transmission is markedly lessened to greatly improve the smoothness of the vehicle ride. Although the present invention has been described for the case of a two-speed automatic transmission, it can as well be applied to the transmissions of three or more speeds. It will be also understood that the principles of the present invention can be applied when affecting a downshift in the same way as when effecting an upshift as discussed above. Further, in the embodiment shown and described above, the frictional transmitting force is detected by oil pressure changes in the servo mechanisms 8' and 9', but it is also possible to detect such transmitting force directly from the torque or by using other means.

What is claimed is:

1. A control system for an automatic transmission having an output shaft for electric automobiles provided with speed change gears having respective working and releasing sides directly connected to an electric motor and frictional coupling means for operating said speed change gears, comprising:

vehicle running control means for driving said electric motor during normal running, changeover means operable, when actuated to interrupt the controlling operation of said running control means, speed control means for controlling said frictional coupling means during the time of speed change, said speed change control means generating a speed change signal to actuate said changeover means to perform a changeover operation during the period when the transmission output shaft torque is varying until the vehicle speed and the motor speed are synchronized, first means for detecting the transmitting force of said frictional coupling means, second means for detecting motor output torque, and torque setting means for controlling the motor output torque during the time of speed change responsive to said first and second means and to said speed change signal so as to eliminate fluctuation of the transmission output shaft torque.

2. The conrol system of claim 1 wherein said frictional coupling means includes clutch means for transmitting force to the releasing side of said speed change gears and brake means for transmitting force to the working side of said speed change gears, and said torque setting means is responsive to the transmitting force of said brake means at the time of speed change to produce a motor output torque having a first gradient of change, and is responsive to the transmitting force of said brake means and that of said clutch means when the transmitting force of each is substantially the same to produce a motor output torque having a second gradient of change, and finally when the transmitting force of said brake means is substantially zero, said torque setting means is responsive to the transmitting force of said clutch means to produce a motor output torque having a third gradient of change, thereby to eliminate fluctuation of the transmission output shaft torque.

3. The control system of claim 1 wherein said first means for detecting the transmitting force of said frictional coupling means includes hydraulic switches responsive to changes in oil pressure indicative of said transmitting force.

4. The control system of claim 1 wherein said vehicle running control during normal running operation is responsive to the depression of an acceleration pedal.

5. The control system of claim 1 further including a vehicle speed detector for generating a signal indicative of vehicle speed and a motor speed detector for generating a signal indicative of motor speed each of which is connected to said speed change control means.

6. The control system of claim 1 wherein said second means for detecting motor output torque includes multiplier means, means for detecting the magnetic flux of the field coil of said electric motor connected to said multiplier means, and means for detecting the current in the armature coil of said electric motor connected to said mutiplier means, said multiplier means providing an output signal proportional to the motor output torque.

* * * * *

UNITED STATES PATENT AND TRADEMARK OFFICE
CERTIFICATE OF CORRECTION

PATENT NO. : 4,021,712
DATED : May 3, 1977
INVENTOR(S) : Tomoo Ishihara, et al

It is certified that error appears in the above-identified patent and that said Letters Patent are hereby corrected as shown below:

On the front page, after "Assignee: Toyota Jidosha Kogyo Kabushiki Kaisha, Toyota, Japan", insert --Nippon Denso Kabushiki Kaisha, Aichi-ken, Japan--.

Signed and Sealed this

Sixth Day of September 1977

[SEAL]

Attest:

RUTH C. MASON
*Attesting Officer*

LUTRELLE F. PARKER
*Acting Commissioner of Patents and Trademarks*